US012632587B2

(12) United States Patent
Maclean et al.

(10) Patent No.: US 12,632,587 B2
(45) Date of Patent: May 19, 2026

(54) ORPHAN DATA IDENTIFICATION AND CLEANUP IN A DATABASE-AS-A-SERVICE CLOUD COMPUTING PLATFORM

(71) Applicant: SAP SE, Walldorf (DE)

(72) Inventors: Scott Maclean, Waterloo (CA); Skandh Gupta, Pune (IN); Mohit Kumar, Pune (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/648,850

(22) Filed: Apr. 29, 2024

(65) Prior Publication Data

US 2025/0335623 A1      Oct. 30, 2025

(51) Int. Cl.
*G06F 21/62* (2013.01)

(52) U.S. Cl.
CPC .. *G06F 21/6227* (2013.01); *G06F 2221/2141* (2013.01)

(58) Field of Classification Search
CPC .................... G06F 21/6227; G06F 2221/2141
See application file for complete search history.

(56) References Cited

U.S. PATENT DOCUMENTS

| | | | | | |
|---|---|---|---|---|---|
| 8,280,913 | B2 * | 10/2012 | Bergin | ................ | G06F 21/6227 707/793 |
| 2014/0012922 | A1 * | 1/2014 | Wu | ........................ | G06F 16/972 709/205 |
| 2024/0135036 | A1 * | 4/2024 | Wakabayashi | ........ | G06F 21/602 |

* cited by examiner

*Primary Examiner* — Khoi V Le
(74) *Attorney, Agent, or Firm* — Sterne, Kessler, Goldstein & Fox P.L.L.C.

(57) ABSTRACT

Disclosed herein are system, method, and computer program product embodiments for identifying and removing orphan data in a Database-as-a-Service (DBaaS) cloud computing platform. In embodiments, a workflow is executed that accesses an event service database of the platform to obtain a list of deleted customer entities, queries a control plane of the platform to obtain a list of existing DBaaS instances, determines that a particular existing DBaaS instance is associated with a particular deleted customer entity, identifies the particular existing DBaaS instance as a potential orphan DBaaS instance, validates that the particular existing DBaaS instance is an orphan DBaaS instance, and in response to validating that the particular existing DBaaS instance is an orphan DBaaS instance, performs one or more of generating an alert that identifies the particular existing DBaaS instance as an orphan DBaaS instance or removing the particular existing DBaaS instance from the DBaaS cloud computing platform.

18 Claims, 4 Drawing Sheets

200

Access an event service database of the DBaaS cloud computing platform to obtain a list of deleted customer entities ⟋ 202

Query a control plane of the DBaaS cloud computing platform to obtain a list of existing DBaaS instances ⟋ 204

Determine that a particular existing DBaaS instance in the list of existing DBaaS instances is associated with a particular deleted customer entity in the list of deleted customer entities ⟋ 206

Identify the particular existing DBaaS instance as a potential orphan DBaaS instance ⟋ 208

Validate that the particular existing DBaaS instance is an orphan DBaaS instance ⟋ 210

In response to at least validating that the particular existing DBaaS instance is an orphan DBaaS instance, performing one or more of (i) generating an alert that identifies the particular existing DBaaS instance as an orphan DBaaS instance or (ii) removing the particular existing DBaaS instance from the DBaaS cloud computing platform ⟋ 212

FIG. 2

300

| 302 |

Access an event service database of the DBaaS cloud computing platform to obtain a list of deleted customer entities

| 304 |

Query a control plane of the DBaaS cloud computing platform to obtain a list of existing DBaaS subscriptions

| 306 |

Determine that a particular existing DBaaS subscripton in the list of existing DBaaS subscriptions is associated with a particular deleted customer entity in the list of deleted customer entities

| 308 |

Identify the particular existing DBaaS subscription as a potential orphan DBaaS subscription

| 310 |

Validate that the particular existing DBaaS subscription is an orphan DBaaS subscription

| 312 |

In response to at least validating that the particular existing DBaaS subscription is an orphan DBaaS subscription, performing one or more of (i) generating an alert that identifies the particular existing DBaaS subscription as an orphan DBaaS subscription or (ii) removing the particular existing DBaaS subscription from the DBaaS cloud computing platform

FIG. 3

ORPHAN DATA IDENTIFICATION AND CLEANUP IN A DATABASE-AS-A-SERVICE CLOUD COMPUTING PLATFORM

BACKGROUND

Cloud service providers provide various computer-based services to customers through the provisioning of cloud computing resources thereto. Such services may include, for example, content as a service (CaaS), digital content as a service (DCaaS), software as a service (SaaS), managed software as a service (MSaaS), platform as a service (PaaS), database as a service (DBaaS), desktop as a service (DaaS), framework as a service (FaaS), backend as a service (BaaS), mobile backend as a service (MBaaS), infrastructure as a service (IaaS), or the like. As part of providing these services to a customer, a cloud service provider may instantiate and/or store customer objects and/or data within a cloud computing platform owned and/or operated by the cloud service provider.

When a customer account or tenant is removed or deprovisioned from a cloud computing platform, it is critical that all objects and data related to the customer account/tenant be deleted. However, due to errors that may occur during the deprovisioning process as well as for other reasons, it is possible that certain objects, data or other information may be left behind (e.g., in a service instance associated with an inactive account/tenant). Such leftover objects, data or other information may be referred to collectively herein as "orphan data."

The failure to remove such orphan data may be problematic for a number of reasons. From a business perspective, the failure to remove orphan data may violate a service level agreement (SLA) or other contractual obligation to a customer that specifies that their objects/data will not be persisted beyond the deletion of an account/tenant (e.g., to protect the confidentiality of that information). From a legal perspective, the failure to remove orphan data may run afoul of a legal requirement of a jurisdiction within which the cloud service provider operates, such as the provisions of the General Data Protection Regulation (GDPR) of the European Union (EU). From a technical perspective, maintaining such objects/data beyond the deletion of the associated account/tenant will unnecessarily consume computing resources (e.g., processor cycles and memory) of the cloud computing platform, thereby negatively affecting the performance of the platform and increasing the operating costs associated therewith.

BRIEF DESCRIPTION OF THE DRAWINGS

The accompanying drawings are incorporated herein and form a part of the specification.

FIG. 2 depicts a flowchart of an example method for identifying and removing orphan data in a DBaaS cloud computing platform, according to some embodiments.

FIG. 3 depicts a flowchart of another example method for identifying and removing orphan data in a DBaaS cloud computing platform, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying and removing orphan data in a cloud computing platform, such as a database as a service (DBaaS) cloud computing platform.

Figure 1:
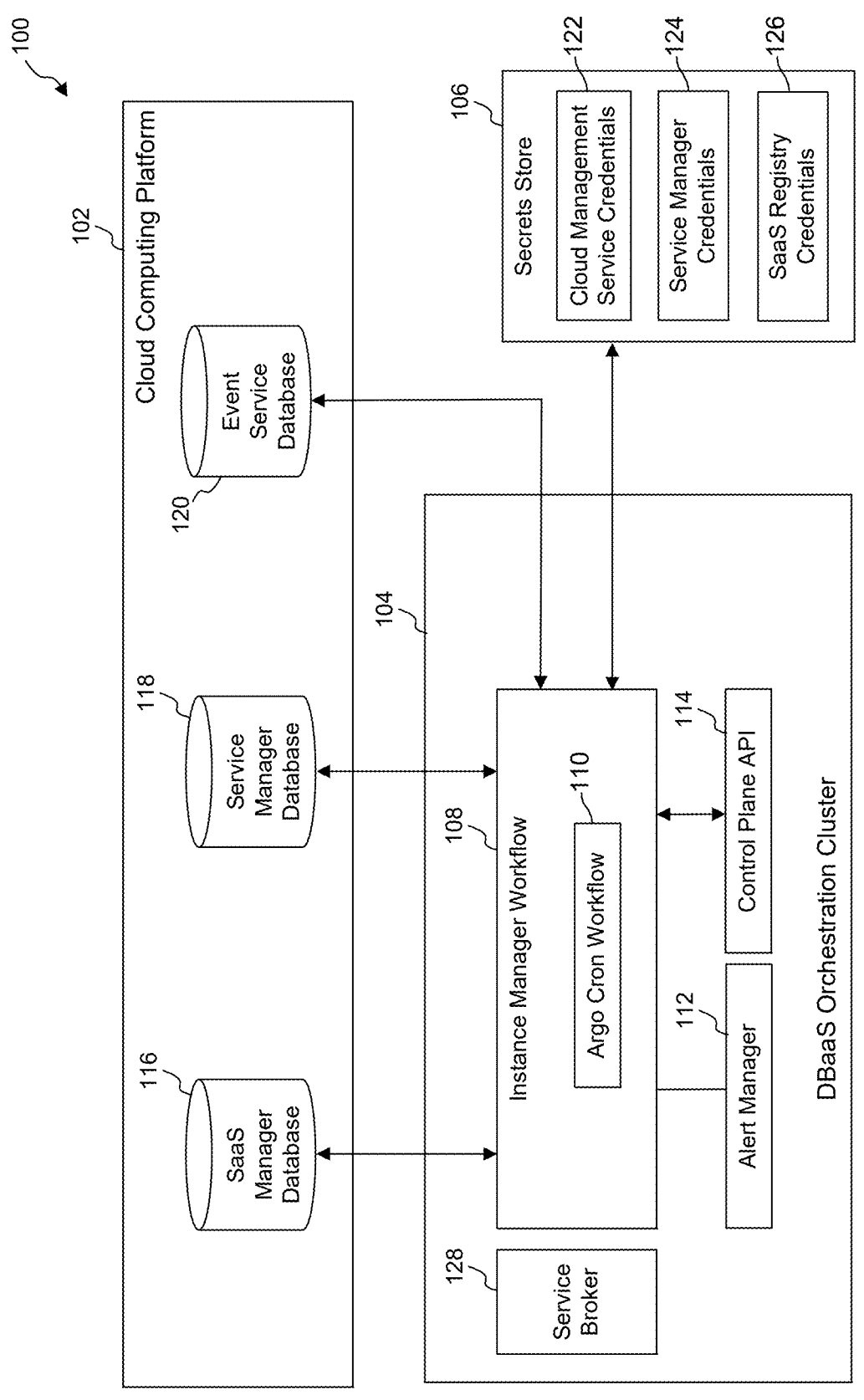
FIG. 1 depicts an example Database-as-a-Service (DBaaS) cloud computing platform that includes components for performing orphan data identification and cleanup in accordance with an embodiment.

FIG. 1 depicts an example DBaaS cloud computing platform 100 that includes components for performing orphan data identification and cleanup in accordance with an embodiment. As shown in FIG. 1, DBaaS cloud computing platform 100 includes a cloud computing platform 102. Cloud computing platform 102 may include a collection of servers and other types of hardware (e.g., routers, switches, storage disks) that are operable to provide cloud computing services to a plurality of customers through the provisioning of cloud computing resources thereto. Cloud computing platform 102 may comprise, for example and without limitation, a hyperscaler comprising multiple data centers, each of which includes the aforementioned hardware as well as associated support infrastructure such as power and cooling systems, uninterruptible power supplies (UPS), and air distribution systems. In an embodiment, cloud computing platform 102 may be configured to provide hardware and software tools as a platform as a service (PaaS) to various customers. In one particular embodiment, cloud computing platform 102 comprises the SAP Business Technology Platform (BTP).

As further shown in FIG. 1, DBaaS cloud computing platform 100 includes a DBaaS orchestration cluster 104. DBaaS orchestration cluster 104 may comprise a set of nodes (e.g., virtual machines or physical machines) that run containerized orchestration processes for DBaaS instances and subscriptions that run on top of cloud computing platform 102. For example, DBaaS orchestration cluster 104 may comprise a Kubernetes cluster and the DBaaS instances and subscriptions may comprise SAP HANA® Cloud instances and application subscriptions that run on top of SAS BTP on behalf of customers. Such DBaaS instances and subscriptions may be executed in various clusters (e.g., Kubernetes clusters) that comprise nodes (e.g., physical machines or virtual machines) within cloud computing platform 102. DBaaS orchestration cluster 104 may comprise a service broker 128 that may act as an interface for provisioning, modifying and deprovisioning DBaaS instances.

DBaaS orchestration cluster 104 may comprise an instance management service that executes thereon. The instance management service may comprise a microservice that operates within DBaaS orchestration cluster 104 under a particular namespace hc-instance-manager. In some embodiments, the instance management service operates to reset passwords for certain privileged users (e.g., HDLADMIN and DBADMIN) using a workflow system, such as an argo workflow system. As will be appreciated by persons skilled in the relevant art(s), an argo workflow may comprise an open source container-native workflow engine for orchestrating parallel jobs on Kubernetes. An argo workflow may be implemented as a Kubernetes CustomResourceDefinition (CRD). An argo workflow template may reside in an instance manager workflow 108 repository. To perform orphan data identification and cleanup, an argo cron workflow 110 may be deployed in the existing namespace hc-instance-manager. The code for identifying and removing orphan data may also reside in instance manager workflow 108 repository. As will be discussed in more detail herein, the identification and removal of orphan data may be performed using an alert-driven approach. Such an approach may ensure that precautionary steps are taken when dealing with customer instances. However, in alternate embodiments, the alert-driven approach may be combined with, or wholly replaced by, an automated approach in which orphan data is automatically deprovisioned. In an embodiment, the code for identifying and removing orphan data may be added to the instance manager workflow repository without communicating with the aforementioned instance management service.

In an embodiment, the orphan data identification and removal workflow may be scheduled to execute at least once a week. In further accordance with such an embodiment, the orphan data identification and removal workflow may be scheduled to execute once every 24 hours. However, these are merely examples, and other schedules may be utilized depending upon the implementation.

The orphan data cleanup process may be designed to identify and remove orphan data within the system. In an embodiment, in order to execute this process, two new service accounts may be created: orphan-detection and orphan-cleanup. Although the existing namespace hc-instance-manager can be used, it may be necessary to define two new service accounts because such new service accounts may require different roles, role bindings, and secrets store permissions compared to the existing service account in the hc-instance-manager namespace.

The orphan-detection service account may be responsible for identifying the orphan data. To list the instances of different plans that have custom resources (CRs) under the DBaaS (e.g., SAP HANA® Cloud Service), the following example roles may be used for the orphan-detection service account:

1. For HANA Instance

```
apiGroups: ["hana.sap.com"]
resources: ["hanaservices"]
verbs: ["get", "list"]
```

2. For HDL Instance

```
apiGroups: ["hc.sap.com"]
resources: ["containergroups","datalakes"]
verbs: ["get", "list"]
```

3. For Spark Instance

```
apiGroups: ["bds.sap.com"]
resources: ["sparkinstances"]
verbs: ["get", "list"]
```

In an embodiment, when a user subscribes to a database tooling/administration application programming interface (API) in a SaaS application (e.g., HANA tooling/administration API), their sub-account may be registered as an application tenant with cloud computing platform 102. This may cause a callback to a microservice that may be referred to as subscription-broker, which creates a subscription CR in DBaaS orchestration cluster 104. In order to list the subscription CRs, the following roles may be utilized:

```
apiGroups: ["subscriptions.hc.sap.com"]
resources: ["subscriptions"]
verbs: ["get", "list"]
```

In an embodiment, the orphan-detection service account may also be granted certain permissions with respect to a secrets store 106. Secrets store 106 may comprise a repository for sensitive data that operates in a separate cluster (e.g., a separate Kubernetes cluster) that exists within cloud computing platform 102 and is isolated from other clusters for security reasons. In particular, the orphan-detection service may be granted the following permissions with respect to secrets store 106: (1) access to cloud management service credentials 122, which may be used to query an event service API and thereby access an event service database 120 within cloud computing platform 102; (2) access to service manager credentials 124, which may be used to query a service manager API and thereby access a service manager database 118 within cloud computing platform 102; and (3) access to SaaS registry credentials 126, which may be used to query a SaaS manager API and thereby access a SaaS manager database 116 within cloud computing platform 102, for the purpose of listing subscription CRs denoting a subscription to database tooling (e.g., HANA tooling).

The orphan-cleanup service account may be responsible for deleting any identified orphan data. In an embodiment, to facilitate deleting a subscription CR, the following roles may be assigned to the orphan-cleanup service account:

```
apiGroups: ["subscriptions.hc.sap.com"]
resources: ["subscriptions"]
verbs: ["delete"]
```

The orphan-cleanup service account may also be assigned secrets store 106 permission to access the credentials of service broker 128 in order to deprovision DBaaS instances.

In an embodiment, argo cron workflow 110 is automatically and periodically executed (e.g., once every 24 hours) to perform a process for identifying and removing orphan data in accordance with the following example steps, which will be discussed in more detail below: (1) list deleted sub-accounts, tenants and organizations from event service data; (2) list DBaaS instances and subscriptions from control plane of DBaaS cloud computing platform; (3) list potential orphan data using event service data; (4) list DBaaS instances from service manager; (5) perform validation check for orphan data; (6) list orphan data using service manager; and (7) create alerts for orphan data.

Step 1. List Deleted Sub-Accounts, Tenants, and Organizations from Event Service Data In an embodiment, argo cron workflow 110 will first fetch the credentials of cloud management service 122 from secrets store 106. Using these credentials, argo cron workflow 110 will generate an access token (e.g., an OAuth access token) by querying the issuer associated with the credentials. Once the access token is generated, argo cron workflow 110 will access event service database 120 by querying a corresponding event service API to obtain a list of deleted subaccounts, tenants and organizations. Event service database 120 may comprise a database of cloud computing platform 102 that stores data about events that have occurred on DBaaS cloud computing platform 100 over a past predefined time period (e.g., over the past 45 days). Thus, the list of deleted subaccounts, tenants and organizations retrieved during this step may represent the list of subaccounts, tenants and organizations that were deleted during the past predefined time period (e.g., past 45 days).

Immediately below is provided an example client URL (cURL) request to obtain all deleted sub-accounts (central event) using the event service API and an associated example response.

CURL Request:

```
curl --location 'https://events-
service.cfapps.sap.hana.ondemand.com/events/v1/events/central? eventType=Subaccount
Deletion&sortOrder=DESC&pageSize=1&pageNum=1' \ --header 'Authorization: Bearer
<JWT Token>'
```

Response:

```
{
    "total": 97833,
    "totalPages": 97833,
    "pageNum": 1,
    "morePages": true,
    "events": [
        {
            "id": 22189543,
            "actionTime": 1693567372387,
            "creationTime": 1693567373076,
            "details": {
                "description": "Subaccount deleted.",
                "guid": "eb17a46a-0203-4a68-a774-a29ea5bcc941",
                "technicalName": "eb17a46a-0203-4a68-a774-a29ea5bcc941",
                "parentGuid": "486903dc-1d7b-4b3f-b580-e4f0641ca805",
                "displayName": "b10-az",
                "subaccountDescription": "create subaccount b10-az by hc tool",
                "region": "eu12",
                "jobLocation": null,
                "subdomain": "b10-az-test",
                "betaEnabled": false
            },
            "globalAccountGUID": "260aa8c7-7538-4563-9f1a-774c868ed022",
            "entityId": "eb17a46a-0203-4a68-a774-a29ea5bcc941",
            "entityType": "Subaccount",
            "eventOrigin": "accounts-service",
            "eventType": "Subaccount_Deletion"
        }
    ]
}
```

In the foregoing example, the entityId field represents the sub-account ID.

In an embodiment, argo cron workflow 110 creates a list of deleted sub-accounts by querying event service database 120 using the event service API repeatedly until the morePages flag is set to false. In further accordance with such an embodiment, the list may be constructed using the entityId values.

Immediately below is provided an example cURL request to obtain all deleted sub-account tenants (local event) using the event service API and an associated example response.

CURL Request

```
curl --location 'https://events-service.cfapps.sap.hana.ondemand.com/events/v1/events?
eventType=SubaccountTenant Deletion&sortOrder=DESC&pageSize=1&pageNum=1' \
--header 'Authorization: Bearer <JWT Token>'
```

Response

```
{
    "total": 34374,
    "totalPages": 34374,
    "pageNum": 1,
    "morePages": true,
    "events": [
        {
            "id": 22189421,
            "actionTime": 1693566993352,
            "creationTime": 1693566994051,
            "details": {
                "tenantId": "5f2af652-74e9-4406-a28c-25547d091da9",
```

-continued

```
      "subaccountGUID": "5f2af652-74e9-4406-a28c-25547d091da9",
      "globalAccountGUID": "e065f1b9-94fc-4494-a009-ceb1cd7bc779",
      "entityType": "Tenant",
      "purge": true,
      "skipUpdateEnvironment": false,
      "skipEnrichEnvironment": false,
      "description": "Deletion of a subaccount tenant"
    },
    "globalAccountGUID": "e065f1b9-94fc-4494-a009-ceb1cd7bc779",
    "entityId": "5f2af652-74e9-4406-a28c-25547d091da9",
    "entityType": "Tenant",
    "eventOrigin": "provisioning-service",
    "eventType": "SubaccountTenant_Deletion"
  }
 ]
}
```

In the foregoing example, the subaccountGUID field represents the sub-account ID of the deleted tenant.

In an embodiment, argo cron workflow 110 creates a list of deleted sub-account tenants by querying event service database 120 using the event service API repeatedly until the morePages flag is set to false. In further accordance with such an embodiment, the list may be constructed using the subaccountGUID values.

Immediately below is provided an example cURL request to obtain all deleted organizations (local event) using the event service API and an associated example response.

CURL Request

```
curl --location 'https://events-service.cfapps.sap.hana.ondemand.com/events/v1/events?
eventType=EnvironmentInstance Deletion&sortOrder=DESC&pageSize=1&pageNum=1'
\ --header 'Authorization: Bearer <JWT Token>'
```

Response

```
{
  "total": 8417,
  "totalPages": 8417,
  "pageNum": 1,
  "morePages": true,
  "events": [
    {
      "id": 22189012,
      "actionTime": 1693565186834,
      "creationTime": 1693565187062,
      "details": {
        "tenantId": "caf4dedf-69fa-4f6e-bcfd-a9d7e5441f58",
        "environmentInstanceId": "43C821F7-8121-413B-820F-1CC4809C9FD0",
        "subaccountGUID": "caf4dedf-69fa-4f6e-bcfd-a9d7e5441f58",
        "globalAccountGUID": "ec958a68-cbdc-4792-b740-b6da37cbf51f",
        "entityType": "ServiceInstance",
        "purge": true,
        "skipUpdateEnvironment": false,
        "skipEnrichEnvironment": true,
        "description": "Deletion of an environment instance",
        "environmentType": "cloudfoundry",
        "environmentInstanceName": "z-auto-subaccount-1693564289-cloud-
            conso-dev-grdcmaster-ccon-auto-1693564289",
        "subaccountGuid": "caf4dedf-69fa-4f6e-bcfd-a9d7e5441f58",
        "platformId": "68a9ebea-13d7-419d-b871-8cb6f2d1383b"
      },
      "globalAccountGUID": "ec958a68-cbdc-4792-b740-b6da37cbf51f",
      "entityId": "43C821F7-8121-413B-820F-1CC4809C9FD0",
      "entityType": "ServiceInstance",
      "eventOrigin": "provisioning-service",
      "eventType": "EnvironmentInstance_Deletion"
    }
  ]
}
```

In the foregoing example, the entityId field represents the organization ID.

In an embodiment, argo cron workflow 110 creates a list of deleted organizations by querying the event service database 120 using the event service API repeatedly until the morePages flag is set to false. In further accordance with such an embodiment, the list may be constructed using the entityId values.

Step 2. List DBaaS Instances and Subscriptions from Control Plane of DBaaS Cloud Computing Platform In Step 2, argo cron workflow 110 obtains a list of DBaaS instances (e.g., instances under SAP HANA® Cloud Service) and subscription CRs by querying a control plane of DBaaS cloud computing platform 100. In an embodiment, querying the control plane of DBaaS cloud computing platform 100 comprises querying a control plan API 114 (e.g., a Kubernetes API server) of DBaaS cloud computing platform 100. In accordance with such an embodiment, argo cron workflow 110 may create a Kubernetes client to fetch the list of DBaaS instances and subscriptions. In an embodiment in which the DBaaS instances are instances under the SAP HANA® Cloud Service, some or all the instance may have corresponding CRs.

Step 3. List Potential Orphan Data Using Event Service Data

As noted above, during Step 1, argo cron workflow 110 may generate a list of deleted sub-accounts, tenants and organizations. As part of that step, argo cron workflow 110 may store such generated list in memory. Furthermore, as noted above, during Step 2, argo cron workflow 110 may generate a list of DBaaS instances and subscriptions (e.g., instances and subscriptions under SAP HANA Cloud Service), along with their labels from the CR. As part of that step, argo cron workflow 110 may also store such generated list in memory.

During Step 3, argo cron workflow 110 may then iterate over the list of DBaaS instances and subscriptions and compare their corresponding CR with the list of deleted sub-accounts, tenants, and organizations to find matches. At the end of this step, argo cron workflow 110 will have generated a list of potential orphan data present in DBaaS cloud computing platform 100 (e.g., SAP HANA Cloud® Service) using event service data from event service database 120. Additional details regarding an implementation of Step 3 will now be provided.

Comparison with the list of deleted sub-accounts. As discussed above, during Step 1, argo cron workflow 110 generates a list of deleted sub-accounts, which is held in memory. Concurrently, argo cron workflow 110 also maintains a list of DBaaS instances and subscriptions procured during Step 2. To determine if a particular DBaaS instance/subscription is part of a deleted sub-account, argo cron workflow 110 may compare the sub-account ID of the DBaaS instance with the list of deleted sub-accounts. The DBaaS instance's sub-account ID may be obtained from the label cf.hc.sap.com/subaccount_id present in its CR. In the case of subscriptions, the sub-account ID may be obtained from the label btp.sap.com/subaccountid presents in its CR.

If there is a match, the DBaaS instance is considered potential orphan data.

Comparison with the list of deleted sub-account tenants. To determine if a particular DBaaS instance/subscription is part of the deleted sub-account tenants, argo cron workflow 110 generates a list of deleted sub-account tenants, which is held in memory, as discussed above in reference to Step 1. Concurrently, argo cron workflow 110 also maintains a list of DBaaS instances and subscriptions procured during Step 2. In certain embodiments, the sub-account tenant ID is the same as the sub-account ID and the list of deleted sub-account tenants contains the sub-account ID of the deleted sub-account tenants. In accordance with such embodiments, to perform the comparison, argo cron workflow 110 checks the DBaaS instance's sub-account ID against the list of deleted sub-account tenants. In certain embodiments, the sub-account ID may be obtained from the cf.hc.sap.com/subaccount_id label present in the DBaaS instance's CR and, in the case of subscriptions, the sub-account ID may be obtained from the label btp.sap.com/subaccountid presents in its CR.

If there is a match, the DBaaS instance is considered potential orphan data.

Comparison with the list of deleted organizations. To identify if a particular DBaaS instance is part of a deleted organization, argo cron workflow 110 generates a list of deleted sub-account tenants, which is held in memory, as discussed above in reference to Step 1. In an embodiment, this check may only be performed for DBaaS instances that have the label cf.hc.sap.com/origin set to cloudfoundry. To determine if a specific DBaaS instance is part of a deleted organization, argo cron workflow 110 compares the DBaaS instance's runtimeaccount ID with the list of deleted organizations. In an embodiment, the DBaaS instance's runtime account ID is obtained from the label btp.sap.com/runtimeAccountID present in its CR and, in the case of subscriptions, the sub-account ID is obtained from the label btp.sap.com/subaccountid presents in its CR.

If there is a match, the DBaaS instance is considered potential orphan data.

Step 4. List DBaaS Instances From Service Manager.

In an embodiment, a service manager within cloud computing platform 102 provides a service-provider-audit plan via which it is possible to view all service instances created for services and service plans offered by a specific service broker. This plan may be used to view DBaaS instances created by subaccount-scoped brokers in DBaaS cloud computing platform 100 (e.g., SAP HANA® Cloud Services). In further accordance with such an embodiment, a tool (e.g., HC Tool) may provision the instance of service manager with service-provider-audit plan, create a binding out of it, and store the binding credentials in secrets store 106 during landscape deployment. Argo cron workflow 110 may retrieve the credentials of service manager 124 from secrets store 106. Using these credentials, argo cron workflow 110 may generate an access token (e.g., an OAuth access token) by querying the issuer associated with the credentials. Once the access token is generated, argo cron workflow 110 accesses service manager database 118 by querying a corresponding service manager API/v1/service_instances to list all the DBaaS instances and stores the list in memory.

Step 5. Perform Validation Check for Orphan Data

After obtaining the list of potential orphan data from the cluster using information obtained from event service database 120 (as discussed above in reference to Step 3), argo cron workflow 110 performs various checks to validate the list. For example, argo cron workflow 110 may perform the following checks:

A. Validation Using the Service-Provider-Audit Plan:

Argo cron workflow 110 contains a list of DBaaS instances that are currently present in service manager database 118, as obtained in Step 4. Argo cron workflow 110 then iterates through the list of potential orphan data and checks if each potential orphan DBaaS instance is present in the list of DBaaS instances from service manager database 118. If a potential orphan DBaaS instance is not found in the list, it indicates a consistency and further checks can be performed. However, if a potential orphan DBaaS instance is found in the list of DBaaS instances from service manager database 118, then this indicates an inconsistency between service manager database 118 and event service database 120. In this case, an alert is triggered. For example, in an embodiment, an alert to a development team (e.g., using notify: dev) is triggered at the instance-level to indicate the inconsistency.

B. Validation Using the lastOperation Timestamp in the DBaaS Instance's CR:

This check may be applicable only for certain types of instances (e.g., DBaaS instances under the SAP HANA® Cloud Service). Each event recorded in event service database 120 includes a creationTime indicating the time when the event record was created. To validate the orphan data, argo cron workflow 110 compares the lastOperation timestamp associated with each potential orphan DBaaS instance (as obtained from the DBaaS instance's CR) with the creationTime of the relevant sub-account/tenant/organization deletion event from event service database 120. If the lastOperation timestamp is greater than the creation Time, the potential orphan DBaaS instance will be treated as a false positive. In this case, an alert will be generated to report the inconsistency between the DBaaS instance's CR and event service database 120. For example, in an embodiment, an alert to a development team (e.g., using notify: dev) is generated at the instance-level to report the inconsistency. Otherwise, the DBaaS instance is confirmed as orphan data.

C. Validation Using the SaaS Manager API

This check may be applicable only to certain subscription CRs. For example, in embodiments, this check may be applicable only to subscription CRs which represent tooling subscriptions by meeting one of the following criteria: (i) they have the hana-cloud! . . . xsappname in the btp.sap.com/sb-count annotation in the CR; or (ii) they do not have the btp.sap.com/sb-count annotation in the CR.

To perform this validation check, argo cron workflow 110 retrieves SaaS registry credentials 126 from secrets store 106. Using these credentials, argo cron workflow 110 generates an access token (e.g., an OAuth access token) by querying the issuer associated with the credentials. Once the access token is generated, argo cron workflow 110 accesses SaaS manager database 116 by querying a corresponding SaaS manager API to obtain the list of subscribed accounts. Argo cron workflow 110 has a list of potential orphan subscription CRs, and it checks whether each one is present in the list of subscribed accounts generated by querying the SaaS manager API.

If a potential orphan subscription CR is present in the list of subscribed accounts, it represents an inconsistency between SaaS manager database 116 and event service database 120. In this case, an alert will be generated to report the inconsistency. For example, in an embodiment, an alert to a development team (using notify: dev) is generated at the instance-level to report the inconsistency. Otherwise, the subscription CR is confirmed as orphan data.

Immediately below is provided an example cURL request to obtain the list of subscription CRs from SaaS manager database 116 using the SaaS Manager API and an associated example response.

CURL Request

```
curl --location 'https://saas-manager.mesh.cf.eu12.hana.ondemand.com/saas-
manager/v1/application/subscriptions&pageNum=1&size=150' \ --header 'Authorization:
Bearer <JWT Token>'
```

Response

```
{
"subscriptions": [
    {
        "url": "https://i574263-m-test.hana-tooling.ingress.orchestration.i574263-m-
            orc-hc-dev.dev-aws.hanacloud.ondemand.com",
        "subdomain": "i574263-m-test",
        "appName": "8cf2a1a6-0b15-4cff-9770-0d9169de61bf",
        "commercialAppName": "8cf2a1a6-0b15-4cff-9770-0d9169de61bf",
        "consumerTenantId": "f32ba8e6-81a5-49f9-8171-758567ba7ccf",
        "globalAccountId": "260aa8c7-7538-4563-9f1a-774c868ed022",
        "subaccountId": "f32ba8e6-81a5-49f9-8171-758567ba7ccf",
        "subscriptionGUID": "3d2bd3b6-b14b-4bb2-b5c3-5f09a9f726a4",
        "state": "SUBSCRIBED",
        "dependencies": [ ],
        "createdOn": "Tue Jan 09 15:57:21 GMT 2024",
        "changedOn": "Tue Jan 09 15:57:23 GMT 2024",
        "internalSubscriptionId": "hana-cloud!t313815_f32ba8e6-81a5-49f9-8171-
            758567ba7ccf_hana-cloud!t313815",
        "authProviderState": "SUBSCRIBED",
        "callbackState": "CREATE_CALLBACK_SUCCEEDED"
    }
],
"morePages": false,
"totalPages": 1,
"total": 1,
"page": 1
}
```

Step 6. List Orphan Data Using Service Manager

Argo cron workflow 110 contains a list of DBaaS instances that are currently present in service manager database 118, as obtained in Step 4. Argo cron workflow 110 also contains a list of DBaaS instances that were obtained by querying the control plane of DBaaS cloud computing platform 100, as obtained in Step 2. Argo cron workflow 110 iterates through the list of DBaaS instances obtained from the control plane and checks whether each DBaaS instance is present in service manager database 118 or not. If a DBaaS instance is not present, it indicates an inconsistency between the control plane and service manager database 118. In this case, an alert will be triggered to indicate the inconsistency. For example, in an embodiment, an alert to central operations (e.g., using notify: ops) will be triggered at the instance level to indicate the inconsistency.

Step 7. Creating Alerts for Orphan Data

In an embodiment, argo cron workflow 110 will create alerts for orphan data to cover a number of different cases. Alerts may be generated by recording information to a log that is monitored by an alert manager 112 (shown in FIG. 1), although other methods may be used. Alerts may be generating in a variety of ways (electronic messages, reports, GUI alerts, or the like) using a variety of different electronic communication channels. In an example embodiment, all alerts will be generated at the instance-level. In an embodiment, argo cron workflow 110 will generate a number of different types of alerts, which will be described below.

Alerts for confirmed orphan data. Such alerts are for DBaaS instances that have been confirmed as orphan data after all the aforementioned validation has been performed. In an embodiment, such alerts may be directed to central operations (e.g., by labelling them with notify: ops).

Alerts for orphan data that represents an inconsistency between service manager database 118 and event service database 120. Such alerts are for DBaaS instances that have been found to be potential orphan data based on data from event service database 120, but which still have an entry present in service manager database 118. In an embodiment, such alerts may be directed to the development team (e.g., by labelling them with notify: dev) as investigation may be required.

Alerts for orphan data that represents an inconsistency between service manager database 118 and the control plane (e.g., Kubernetes API server). Such alerts are for DBaaS instances that are identified by the control plane but are not present in service manager database 118. In an embodiment, such alerts may be directed to the development team (e.g., raised with the label notify: ops).

Alerts for orphan data that represents and inconsistency between a DBaaS instance's CR and event service database 120. Such alerts are for DBaaS instances who lastOperation timestamp is greater than creationTime of the corresponding event in event service database 120. In an embodiment, such alerts may be directed to the development team (e.g., raised with the label notify: dev) as investigation may be required.

Alerts for orphan data that represents an inconsistency between SaaS manager database 116 and event service database 120. Such alerts are for subscription CRs that have been found to be potential orphan data based on data in event service database 120, but which still have an entry present in SaaS manager database 116. In an embodiment, such alerts may be directed to the development team (e.g., raised with the label notify: dev) as investigation may be required.

FIG. 2 is a flowchart for a method 200 for identifying and removing orphan data in a DBaaS cloud computing platform, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In an embodiment, method 200 may be performed by argo cron workflow 110 that is automatically executed by DBaaS orchestration cluster 104 of DBaaS cloud computing platform 100 in accordance with a predefined schedule. For example, method 200 may be performed by argo cron workflow 110 every 24 hours.

In 202, argo cron workflow 110 accesses event service database 120 of DBaaS cloud computing platform 100 to obtain a list of deleted customer entities. As previously discussed, event service database 120 stores data about events that have occurred on DBaaS cloud computing platform 102 over a past predefined time period (e.g., a past 45 days). In an embodiment, the list of deleted customer entities obtained by argo cron workflow 110 comprises a list of deleted sub-accounts, deleted sub-account tenants, and deleted organizations. In a further embodiment, argo cron workflow 110 accesses event service database 120 to obtain the list of deleted customer entities by obtaining credentials (e.g., cloud management service credentials 122) from secrets store 106 within DBaaS cloud computing platform 100, and by using the credentials to access event service database 120.

In 204, argo cron workflow 110 queries a control plane of DBaaS cloud computing platform 100 to obtain a list of existing DBaaS instances. In an embodiment, this may entail querying a container orchestration platform (e.g., Kubernetes) API server of DBaaS cloud computing platform 100.

In 206, argo cron workflow 110 determines that a particular existing DBaaS instance in the list of existing DBaaS instances is associated with a particular deleted customer entity in the list of deleted customer entities.

In 208, argo cron workflow 110 identifies the particular existing DBaaS instance as a potential orphan DBaaS instance.

In 210, argo cron workflow 110 validates that the particular existing DBaaS instance is an orphan DBaaS instance. In an embodiment, argo cron workflow 110 validates that the particular existing DBaaS instance is an orphan DBaaS instance by confirming that the particular existing DBaaS instance is not included in a list of registered DBaaS instances stored in service manager database 118 of DBaaS cloud computing platform 100. In further accordance with such an embodiment, this may entail argo cron workflow 110 obtaining credentials (e.g., service manager credentials 124) from secrets store 106 of DBaaS cloud computing platform 100 and using the credentials to obtain the list of registered DBaaS instances from service manager database 118.

In an embodiment, argo cron workflow 110 may further validate that the particular existing DBaaS instance is an orphan DBaaS instance by determining that a last operation timestamp associated with the particular existing DBaaS instance and obtained from the control plane of the DBaaS cloud computing platform (e.g., from a Kubernetes API server) is less than a creation timestamp of a deletion event associated with the particular deleted customer entity and obtained from event service database 120.

In 212, in response to at least validating that the particular existing DBaaS instance is an orphan DBaaS instance, argo cron workflow 110 performs one or more of: generating an alert that identifies the particular existing DBaaS instance as an orphan DBaaS instance, or removing the particular existing DBaaS instance from DBaaS cloud computing platform 100.

FIG. 3 is a flowchart for a method 300 for identifying and removing orphan data in a DBaaS cloud computing platform, according to a further embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In an embodiment, method 300 may be performed by argo cron workflow 110 that is automatically executed by DBaaS orchestration cluster 104 of DBaaS cloud computing platform 100 in accordance with a predefined schedule. For example, method 300 may be performed by argo cron workflow 110 every 24 hours. In an embodiment, method 300 may be performed concurrently or in combination with method 200 as previously described in reference to FIG. 2.

In 302, argo cron workflow 110 accesses event service database 120 of DBaaS cloud computing platform 100 to obtain a list of deleted customer entities. As previously discussed, event service database 120 stores data about events that have occurred on DBaaS cloud computing platform 102 over a past predefined time period (e.g., a past 45 days). In an embodiment, the list of deleted customer entities obtained by argo cron workflow 110 comprises a list of deleted sub-accounts, deleted sub-account tenants, and deleted organizations. In a further embodiment, argo cron workflow 110 accesses event service database 120 to obtain the list of deleted customer entities by obtaining credentials (e.g., cloud management service credentials 122) from secrets store 106 within DBaaS cloud computing platform 100, and by using the credentials to access event service database 120.

In 304, argo cron workflow 110 queries a control plane of DBaaS cloud computing platform 100 to obtain a list of existing DBaaS subscriptions. In an embodiment, this may entail querying a container orchestration platform (e.g., Kubernetes) API server of DBaaS cloud computing platform 100.

In 306, argo cron workflow 110 determines that a particular existing DBaaS subscription in the list of existing DBaaS subscriptions is associated with a particular deleted customer entity in the list of deleted customer entities.

In 308, argo cron workflow 110 identifies the particular existing DBaaS subscription as a potential orphan DBaaS instance.

In 310, argo cron workflow 110 validates that the particular existing DBaaS subscription is an orphan DBaaS subscription. In an embodiment, argo cron workflow 110 validates that the particular existing DBaaS subscription is an orphan DBaaS subscription by at least confirming that the particular existing DBaaS subscription is not included in a list of registered DBaaS subscriptions stored in SaaS manager database 116 of DBaaS cloud computing platform 100. In further accordance with such an embodiment, argo cron workflow may perform this operation by obtaining credentials (e.g., SaaS registry credentials 126) from secrets store 106 of DBaaS cloud computing platform 100 and using the credentials to obtain the list of registered DBaaS subscriptions from SaaS manager database 116.

In 312, in response to at least validating that the particular existing DBaaS subscription is an orphan DBaaS subscription, argo cron workflow 110 performs one or more of: generating an alert that identifies the particular existing DBaaS subscription as an orphan DBaaS subscription, or removing the particular existing DBaaS subscription from DBaaS cloud computing platform 100.

Figure 4:
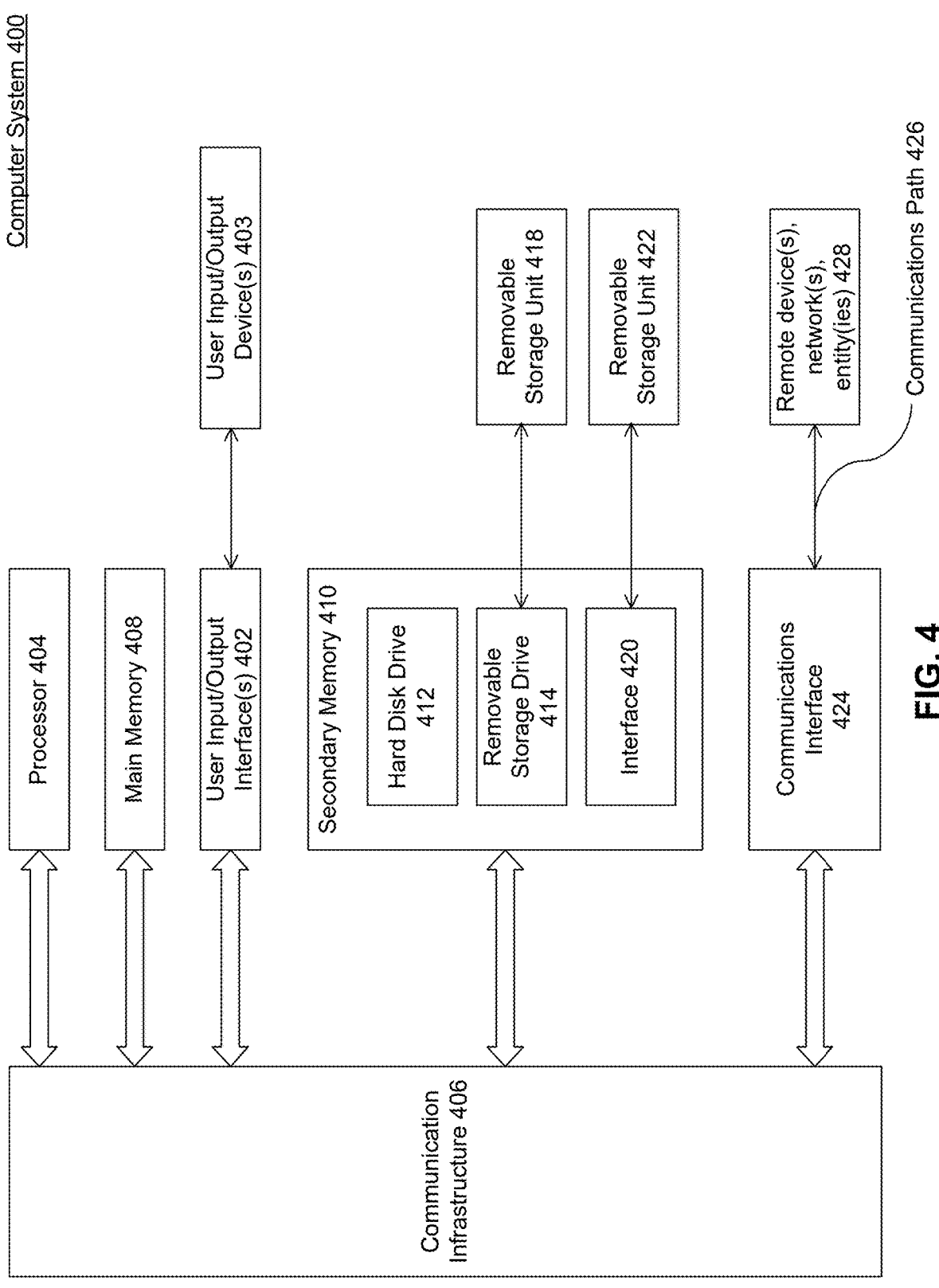
FIG. 4 is a block diagram of an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of removable storage unit 422 and interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or variable, but every embodiment can not necessarily include the particular feature, structure, or variable. Moreover, such phrases are not necessarily referring to the same embodiment. Further, when a particular feature, structure, or variable is described in connection with an embodiment, it would be within the knowledge of persons skilled in the relevant art(s) to incorporate such feature, structure, or variable into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for identifying and removing orphan data in a database as a service (DBaaS) cloud computing platform, comprising:

generating an orphan-detection service account on the DBaaS cloud computing platform, wherein the orphan-detection service account comprises permission to access event service database credentials from an isolated secret store, wherein the isolated secret store is a repository of credentials that operates in an isolated cluster;

obtaining, via the orphan-detection service account, the event service database credentials from the isolated secret store;

generating an event service database access token based on the event service database credentials;

accessing, using the event service database access token, an event service database of the DBaaS cloud computing platform to obtain a list of deleted customer entities, the event service database storing data about events that have occurred on the DBaaS cloud computing platform over a past predefined time period;

querying a control plane of the DBaaS cloud computing platform to obtain a list of existing DBaaS instances;

determining that a particular existing DBaaS instance in the list of existing DBaaS instances is associated with a particular deleted customer entity in the list of deleted customer entities;

identifying the particular existing DBaaS instance as a potential orphan DBaaS instance;

validating that the particular existing DBaaS instance is an orphan DBaaS instance, wherein the validating comprises at least confirming that the particular existing DBaaS instance is not included in a list of registered DBaaS instances stored in a service manager database of the DBaaS cloud computing platform; and in response to at least validating that the particular existing DBaaS instance is an orphan DBaaS instance, generating an orphan-cleanup service account on the DBaaS cloud computing platform, wherein the orphan-cleanup service account includes permission to access service broker credentials from the isolated secret store; and deprovisioning, using the orphan-cleanup service account, the particular existing DBaaS instance from the DBaaS cloud computing platform by sending, using the service broker credentials, a delete request, via an application programming interface (API), to the service broker, wherein the service broker modifies, provisions, or deprovisions DBaaS instances.

2. The computer-implemented method of claim 1, wherein the computer-implemented method is performed by a workflow that is automatically executed by an orchestration cluster of the DBaaS cloud computing platform in accordance with a predefined schedule.

3. The computer-implemented method of claim 1, wherein accessing the event service database of the DBaaS cloud computing platform to obtain the list of deleted customer entities comprises:

accessing the event service database of the DBaaS cloud computing platform to obtain a list of deleted sub-accounts, deleted sub-account tenants, and deleted organizations.

4. The computer-implemented method of claim 1, wherein confirming that the particular existing DBaaS instance is not included in the list of registered DBaaS instances stored in the service manager database of the DBaaS cloud computing platform comprises:

obtaining credentials from the isolated secret store of the DBaaS cloud computing platform; and using the credentials to obtain the list of registered DBaaS instances from the service manager database.

5. The computer-implemented method of claim 1, wherein validating that the particular existing DBaaS instance is an orphan DBaaS instance further comprises:

determining that a last operation timestamp associated with the particular existing DBaaS instance and obtained from the control plane of the DBaaS cloud computing platform is less than a creation timestamp of a deletion event associated with the particular deleted customer entity and obtained from the event service database.

6. The computer-implemented method of claim 1, further comprising:

querying the control plane of the DBaaS cloud computing platform to obtain a list of existing DBaaS subscriptions;

determining that a particular existing DBaaS subscription in the list of existing DBaaS subscriptions is associated with the particular deleted customer entity;

identifying the particular existing DBaaS subscription as a potential orphan DBaaS subscription;

validating that the particular existing DBaaS subscription is an orphan DBaaS subscription, wherein the validating comprises at least confirming that the particular existing DBaaS subscription is not included in a list of registered DBaaS subscriptions stored in a Software-as-a-Service (Saas) manager database of the DBaaS cloud computing platform; and in response to validating that the particular existing DBaaS subscription is an orphan DBaaS subscription, performing one or more of:

generating an alert that identifies the particular existing DBaaS subscription as an orphan DBaaS subscription; or removing the particular existing DBaaS subscription from the DBaaS cloud computing platform.

7. The computer-implemented method of claim 6, wherein confirming that the particular existing DBaaS subscription is not included in the list of registered DBaaS subscriptions stored in the SaaS manager database of the DBaaS cloud computing platform comprises:

obtaining credentials from the isolated secret store of the DBaaS cloud computing platform; and using the credentials to obtain the list of registered DBaaS subscriptions from the SaaS manager database.

8. A system for identifying and removing orphan data in a database as a service (DBaaS) cloud computing platform, comprising:

a memory; and at least one processor coupled to the memory and configured to perform operations, the operations comprising:

generating an orphan-detection service account on the DBaaS cloud computing platform, wherein the orphan-detection service account comprises permission to access event service database credentials from an isolated secret store, wherein the isolated secret store is a repository of credentials that operates in an isolated cluster;

obtaining, via the orphan-detection service account, the event service database credentials from the isolated secret store;

generating an event service database access token based on the event service database credentials;

accessing, using the event service database access token, an event service database of the DBaaS cloud computing platform to obtain a list of deleted customer entities, the event service database storing data about events that have occurred on the DBaaS cloud computing platform over a past predefined time period;

querying a control plane of the DBaaS cloud computing platform to obtain a list of existing DBaaS instances;

determining that a particular existing DBaaS instance in the list of existing DBaaS instances is associated with a particular deleted customer entity in the list of deleted customer entities;

identifying the particular existing DBaaS instance as a potential orphan DBaaS instance;

validating that the particular existing DBaaS instance is an orphan DBaaS instance, wherein the validating comprises at least confirming that the particular existing DBaaS instance is not included in a list of registered DBaaS instances stored in a service manager database of the DBaaS cloud computing platform; and in response to at least validating that the particular existing DBaaS instance is an orphan DBaaS instance, generating an orphan-cleanup service account on the DBaaS cloud computing platform, wherein the orphan-cleanup service account includes permission to access service broker credentials from the isolated secret store; and deprovisioning, using the orphan-cleanup service account, the particular existing DBaaS instance from the DBaaS cloud computing platform by sending, using the service broker credentials, a delete request, via an application programming interface (API), to the service broker, wherein the service broker modifies, provisions, or deprovisions DBaaS instances.

9. The system of claim 8, wherein the at least one processor is configured to perform the operations by automatically executing a workflow in accordance with a predefined schedule.

10. The system of claim 8, wherein accessing the event service database of the DBaaS cloud computing platform to obtain the list of deleted customer entities comprises:

accessing the event service database of the DBaaS cloud computing platform to obtain a list of deleted subaccounts, deleted sub-account tenants, and deleted organizations.

11. The system of claim 8, wherein confirming that the particular existing DBaaS instance is not included in the list of registered DBaaS instances stored in the service manager database of the DBaaS cloud computing platform comprises:

obtaining credentials from the isolated secret store of the DBaaS cloud computing platform; and using the credentials to obtain the list of registered DBaaS instances from the service manager database.

12. The system of claim 8, wherein validating that the particular existing DBaaS instance is an orphan DBaaS instance further comprises:

determining that a last operation timestamp associated with the particular existing DBaaS instance and obtained from the control plane of the DBaaS cloud computing platform is less than a creation timestamp of a deletion event associated with the particular deleted customer entity and obtained from the event service database.

13. The system of claim 8, wherein the operations further comprise:

querying the control plane of the DBaaS cloud computing platform to obtain a list of existing DBaaS subscriptions;

determining that a particular existing DBaaS subscription in the list of existing DBaaS subscriptions is associated with the particular deleted customer entity;

identifying the particular existing DBaaS subscription as a potential orphan DBaaS subscription;

validating that the particular existing DBaaS subscription is an orphan DBaaS subscription, wherein the validating comprises at least confirming that the particular existing DBaaS subscription is not included in a list of registered DBaaS subscriptions stored in a Software-as-a-Service (Saas) manager database of the DBaaS cloud computing platform; and in response to validating that the particular existing DBaaS subscription is an orphan DBaaS subscription, performing one or more of:

generating an alert that identifies the particular existing DBaaS subscription as an orphan DBaaS subscription; or removing the particular existing DBaaS subscription from the DBaaS cloud computing platform.

14. The system of claim 13, wherein confirming that the particular existing DBaaS subscription is not included in the list of registered DBaaS subscriptions stored in the SaaS manager database of the DBaaS cloud computing platform comprises:

obtaining credentials from the isolated secret store of the DBaaS cloud computing platform; and using the credentials to obtain the list of registered DBaaS subscriptions from the SaaS manager database.

15. A non-transitory computer-readable device having instructions stored thereon that, when executed by at least one computing device, cause the at least one computing device to perform operations for identifying and removing orphan data in a database as a service (DBaaS) cloud computing platform, the operations comprising:

generating an orphan-detection service account on the DBaaS cloud computing platform, wherein the orphan-detection service account comprises permission to access event service database credentials from an isolated secret store, wherein the isolated secret store is a repository of credentials that operates in an isolated cluster;

obtaining, via the orphan-detection service account, the event service database credentials from the isolated secret store;

generating an event service database access token based on the event service database credentials;

accessing, using the event service database access token, an event service database of the DBaaS cloud computing platform to obtain a list of deleted customer entities, the event service database storing data about events that have occurred on the DBaaS cloud computing platform over a past predefined time period;

querying a control plane of the DBaaS cloud computing platform to obtain a list of existing DBaaS instances;

determining that a particular existing DBaaS instance in the list of existing DBaaS instances is associated with a particular deleted customer entity in the list of deleted customer entities;

identifying the particular existing DBaaS instance as a potential orphan DBaaS instance;

validating that the particular existing DBaaS instance is an orphan DBaaS instance, wherein the validating comprises at least confirming that the particular existing DBaaS instance is not included in a list of registered DBaaS instances stored in a service manager database of the DBaaS cloud computing platform; and in response to at least validating that the particular existing DBaaS instance is an orphan DBaaS instance, generating an orphan-cleanup service account on the DBaaS cloud computing platform, wherein the orphan-cleanup service account includes permission to access service broker credentials from the isolated secret store; and deprovisioning, using the orphan-cleanup service account, the particular existing DBaaS instance from the DBaaS cloud computing platform by sending, using the service broker credentials, a delete request, via an application programming interface (API), to the service broker, wherein the service broker modifies, provisions, or deprovisions DBaaS instances.

16. The non-transitory computer-readable device of claim 15, wherein the operations are performed by a workflow that is automatically executed by an orchestration cluster of the DBaaS cloud computing platform in accordance with a predefined schedule.

17. The non-transitory computer-readable device of claim 15, wherein validating that the particular existing DBaaS instance is an orphan DBaaS instance further comprises:

determining that a last operation timestamp associated with the particular existing DBaaS instance and obtained from the control plane of the DBaaS cloud computing platform is less than a creation timestamp of a deletion event associated with the particular deleted customer entity and obtained from the event service database.

18. The non-transitory computer-readable device of claim 15, wherein the operations further comprise:

querying the control plane of the DBaaS cloud computing platform to obtain a list of existing DBaaS subscriptions;

determining that a particular existing DBaaS subscription in the list of existing DBaaS subscriptions is associated with the particular deleted customer entity;

identifying the particular existing DBaaS subscription as a potential orphan DBaaS subscription;

validating that the particular existing DBaaS subscription is an orphan DBaaS subscription, wherein the validating comprises at least confirming that the particular existing DBaaS subscription is not included in a list of registered DBaaS subscriptions stored in a Software-as-a-Service (SaaS) manager database of the DBaaS cloud computing platform; and in response to validating that the particular existing DBaaS subscription is an orphan DBaaS subscription, performing one or more of:

generating an alert that identifies the particular existing DBaaS subscription as an orphan DBaaS subscription; or removing the particular existing DBaaS subscription from the DBaaS cloud computing platform.

* * * * *